(12) United States Patent
Chen

(10) Patent No.: US 7,457,251 B1
(45) Date of Patent: Nov. 25, 2008

(54) TECHNIQUE FOR GROUP-BASED ROUTING UPDATE WITH LIMITED PER NEIGHBOR/ADJACENCY CUSTOMIZATION

(75) Inventor: Enke Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1686 days.

(21) Appl. No.: 10/126,206

(22) Filed: Apr. 19, 2002

Related U.S. Application Data

(63) Continuation of application No. 09/270,557, filed on Mar. 16, 1999, now Pat. No. 6,392,997.

(51) Int. Cl.
- *H04L 12/28* (2006.01)
- *H04L 12/56* (2006.01)
- *G06F 15/173* (2006.01)

(52) U.S. Cl. .................. 370/252; 370/392; 370/401; 370/428; 709/238; 709/242

(58) Field of Classification Search .......... 370/238–252, 370/351–395, 401–412; 709/223–230, 238–242
See application file for complete search history.

(56) References Cited

U.S. PATENT DOCUMENTS

| | | | | |
|---|---|---|---|---|
| 5,519,704 A | * | 5/1996 | Farinacci et al. | 370/402 |
| 5,856,974 A | * | 1/1999 | Gervais et al. | 370/392 |
| 5,881,243 A | * | 3/1999 | Zaumen et al. | 709/241 |
| 5,964,841 A | * | 10/1999 | Rekhter | 709/242 |
| 6,094,525 A | * | 7/2000 | Perlman et al. | 709/245 |
| 6,167,444 A | * | 12/2000 | Boden et al. | 709/223 |
| 6,173,324 B1 | * | 1/2001 | D'Souza | 709/224 |
| 6,260,070 B1 | * | 7/2001 | Shah | 709/230 |
| 6,704,795 B1 | * | 3/2004 | Fernando et al. | 709/237 |

\* cited by examiner

*Primary Examiner*—Man Phan
(74) *Attorney, Agent, or Firm*—Cesari and McKenna LLP

(57) ABSTRACT

An improved group-based routing update technique allows limited per neighbor customization of routing update messages generated by an interdomain router for its neighboring peer routers within autonomous systems of a computer network. The technique may be employed when the neighboring peer routers share identical routing policies, but the routing update messages differ only in certain attributes with known locations and lengths. Appropriate values of the location and length attributes for each neighboring router are calculated and stored during a replication stage of the improved technique. Before each message is transmitted, the proper location and length attributes of the message are updated with the stored values for the respective neighbor.

29 Claims, 5 Drawing Sheets

TECHNIQUE FOR GROUP-BASED ROUTING UPDATE WITH LIMITED PER NEIGHBOR/ADJACENCY CUSTOMIZATION

CROSS-REFERENCE TO RELATED APPLICATIONS

The present application is a continuation of commonly assigned U.S. patent application Ser. No. 09/270,557, which was filed on Mar. 16, 1999, by Enke Chen for a TECHNIQUE FOR GROUP-BASED ROUTING UPDATE WITH LIMITED PER NEIGHBOR/ADJACENCY CUSTOMIZATION, now issued as U.S. Pat. No. 6,392,997 on May 21, 2003, and is hereby incorporated by reference.

BACKGROUND OF THE INVENTION

1. Field of the Invention

This invention relates generally to computer networks and, more particularly, to routing updates associated with routing protocols used in a computer network.

2. Background Information

A computer network is a geographically distributed collection of interconnected communication links for transporting data between nodes, such as computers. Many types of computer networks are available, with the types ranging from Local Area Networks (LANs) to Wide Area Networks (WANs). The nodes typically communicate by exchanging discrete frames or packets of data according to pre-defined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as autonomous systems or routing domains. The networks within a routing domain are typically coupled together by conventional "intradomain" routers. Yet it still may be desirable to increase the number of nodes capable of exchanging data; in this case, "interdomain" routers executing interdomain routing protocols are used to interconnect nodes of the various autonomous systems. An example of an interdomain routing protocol is the Border Gateway Protocol (BGP) which performs routing between autonomous systems by exchanging routing and reachability information among interdomain routers of the systems. The interdomain routers configured to execute the BGP protocol, called BGP routers, maintain routing tables, transmit routing update messages and render routing decisions based on routing metrics.

Specifically, each BGP router maintains a routing table that lists all feasible paths to a particular network. Periodic refreshing of the routing table is generally not performed; however, BGP peer routers residing in the autonomous systems exchange routing information under certain circumstances. For example, when a BGP router initially connects to the network, the peer routers exchange the entire contents of their routing tables. Thereafter when changes occur to those contents, the routers exchange only those portions of their routing tables that change in order to update their peers' tables. These update messages, which are sent in response to routing table changes, advertise only an optimal path to a particular network. The optimal path is advertised as a single routing metric consisting of an arbitrary unit number that specifies a degree of preference for a particular link. The BGP routing protocol is well-known and described in detail in *Request For Comments* (RFC) 1771, by Y. Rekhter and T. Li (1995), and *Interconnections, Bridges and Routers*, by R. Perlman, published by Addison Wesley Publishing Company, at pages 323-329 (1992), all disclosures of which are hereby incorporated by reference.

Broadly stated, a BGP router generates routing update messages for an adjacency or neighbor peer router by "walking-through" the routing table and applying appropriate routing policies. A routing policy is information that enables a BGP router to rank routes according to filtering and preference (i.e., the "optimal route"). Routing updates provided by the update message allows BGP routers of the autonomous systems to construct a consistent view of the network topology. The update messages are typically sent using a reliable transport, such as the Transmission Control Protocol (TCP), to ensure reliable delivery. TCP is a transport protocol implemented by a transport layer of the Internet Protocol (IP) architecture; the term TCP/IP is commonly used to denote this architecture. The TCP/IP architecture is well-known and described in *Computer Networks, 3rd Edition*, by Andrew S. Tanenbaum, published by Prentice-Hall (1996).

When more than one neighbor share similar routing policies and these neighbors share a common subnetwork, "identical" update messages may be sent by a BGP router to these neighboring peers of the autonomous systems. In this context, a common sub-network (subnet) is defined as a shared medium, such as a LAN, that allows the updating router to access its neighboring peer routers through a single network interface. When the neighbors share a common subnet, a grouped-based routing arrangement may be further employed that optimizes generation of the identical routing update messages. That is, the BGP router may generate an update message for one neighbor and then replicate that message for all other neighbors in accordance with a conventional replication process.

Specifically, the router generates the actual data contained in the update message and stores that data in a memory location of the router. The router then generates a header for each neighbor receiving the update; the header includes a pointer referencing the address of the message data location in memory. The router then processes each header to construct a message for each neighbor and transmits the messages such that each neighbor receives an identical copy of the actual message data. In a large network, the technique of grouping neighboring peer routers according to common subnets substantially reduces memory and processor utilization, thereby increasing the rate of (i.e., speeding-up) routing updates.

However, an inconsistent routing situation arises if the grouped-based routing arrangement is employed with a set of neighboring peer routers that do not share a common subnet. In other words, if multiple external BGP neighbors span multiple networks, the neighbors cannot be grouped by a common subnet because a next-hop attribute of the routing update message is different for each of these neighbors. The update routing message is thus not "identical" for each neighbor even if these neighbors share identical routing policies, and use of the conventional grouping arrangement results in incorrect (or misformatted) update messages being sent to the BGP peer receivers.

Accordingly, the routing update message must be generated separately for each neighboring peer router that does not share the common subnet. Separate generation of update messages causes substantial processor and memory resource consumption at the updating router which, in turn, limits router update performance. The present invention is directed to solving this problem and, in particular, to providing a technique for efficiently generating update messages for neighboring peer routers that do not share a common subnet.

SUMMARY OF THE INVENTION

The invention comprises an improved group-based routing update technique that allows limited per neighbor customization of routing update messages generated by an interdomain router for its neighboring peer routers within autonomous systems of a computer network. The inventive technique may be employed when the neighboring peer routers share identical routing policies, but the routing update messages differ only in certain attributes with known locations and lengths. Broadly stated, appropriate values of the location and length attributes for each neighboring router are calculated and stored during a novel replication stage of the inventive technique. Before each message is transmitted, the proper location and length attributes of the message are updated with the stored values for the respective neighbor.

In accordance with the inventive technique, the interdomain router generates a routing update message comprising a message data portion and further generates a plurality of headers, each associated with a neighboring peer router. Each header contains a plurality of pointers, one of which references the beginning of the message data portion stored in a memory of the interdomain router (the message pointer) and another of which references a location (the referenced field) within the message data portion that requires customization for each neighbor (the field pointer). The header further contains an actual value to be loaded into the referenced field for each neighbor router.

Operationally, the interdomain router initially generates a routing update message (including the message data portion) for a first neighbor. The router also generates a first header that contains the message pointer and the field pointer, along with a first value to be loaded into the referenced field of the message data portion for the first neighbor. The update message is then replicated for a second neighbor by creating a second header containing the message pointer and the field pointer; this time, however, the second header contains a second value to be loaded into the referenced field for the second neighbor. The replication process is repeated for each neighboring peer router receiving the routing update message. Immediately before transmitting the routing message to each neighbor, the content of the referenced field in the message data portion is replaced by the value contained in the header for each neighboring peer router. Thereafter, the message is transmitted to each neighbor.

Thus, instead of generating different copies of the routing update message for each neighboring peer router, a single data portion of the update message is created and only a specific field of that message is customized for each neighbor prior to transmitting the message to that neighbor. Advantageously, the inventive technique substantially conserves memory and processor resources when generating and transmitting routing update messages in a large network.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
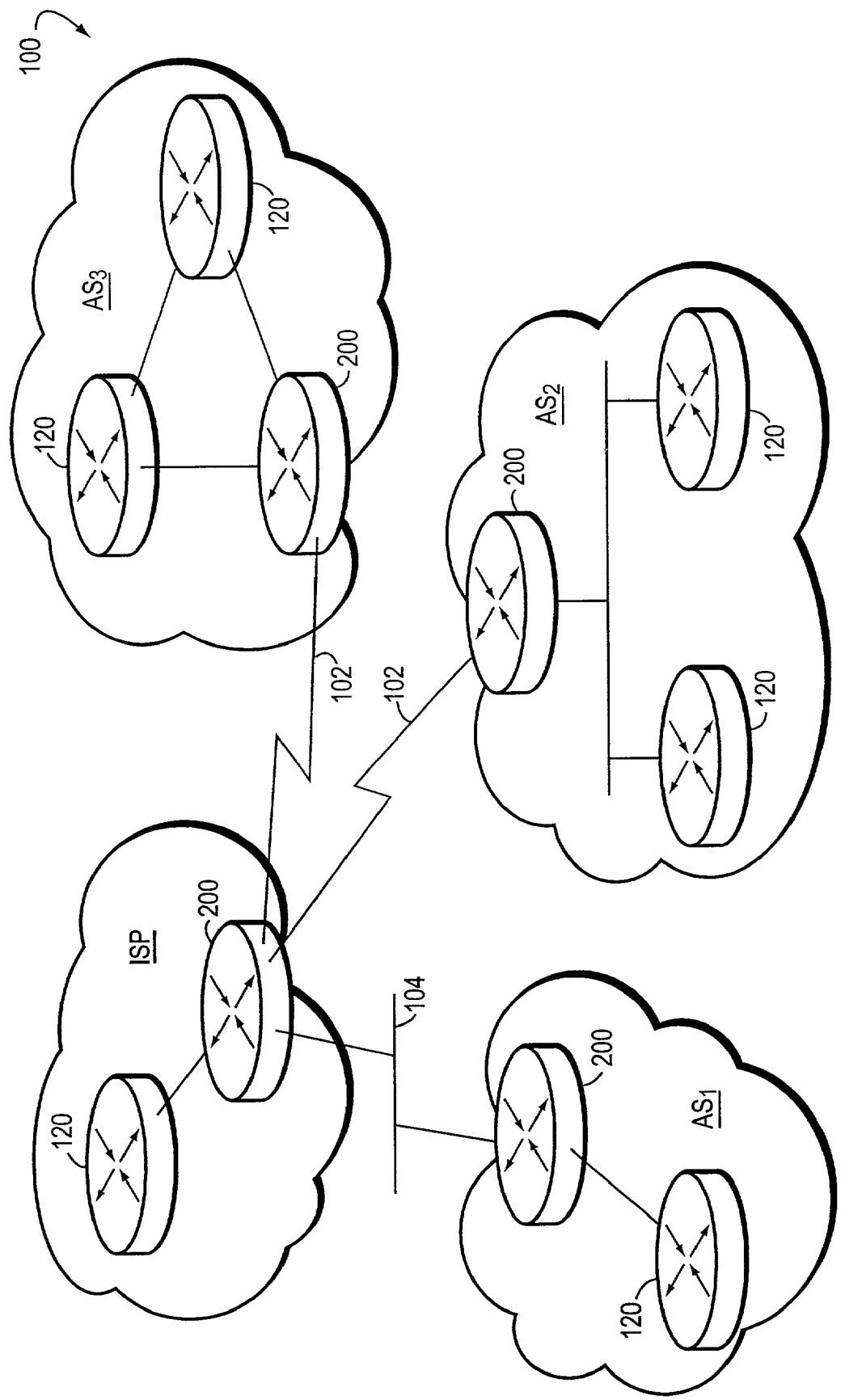
FIG. 1 is a schematic block diagram of a computer network comprising a plurality of autonomous systems or routing domains interconnected by intermediate nodes, such as interdomain routers.

FIG. 1 is a schematic block diagram of a computer network 100 comprising a plurality of autonomous systems or routing domains interconnected by intermediate nodes, such as conventional intradomain routers 120 and interdomain routers 200. The autonomous systems include an Internet Service Provider (ISP) domain and various routing domains ($AS_{1-3}$) interconnected by the interdomain routers 200. The interdomain routers 200 are further interconnected by shared medium networks 104, such as Local Area Networks (LANs), and point-to-point links 102, such as frame relay links, asynchronous transfer mode links or other serial links. Communication among the routers is typically effected by exchanging discrete data frames or packets in accordance with predefined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 2:
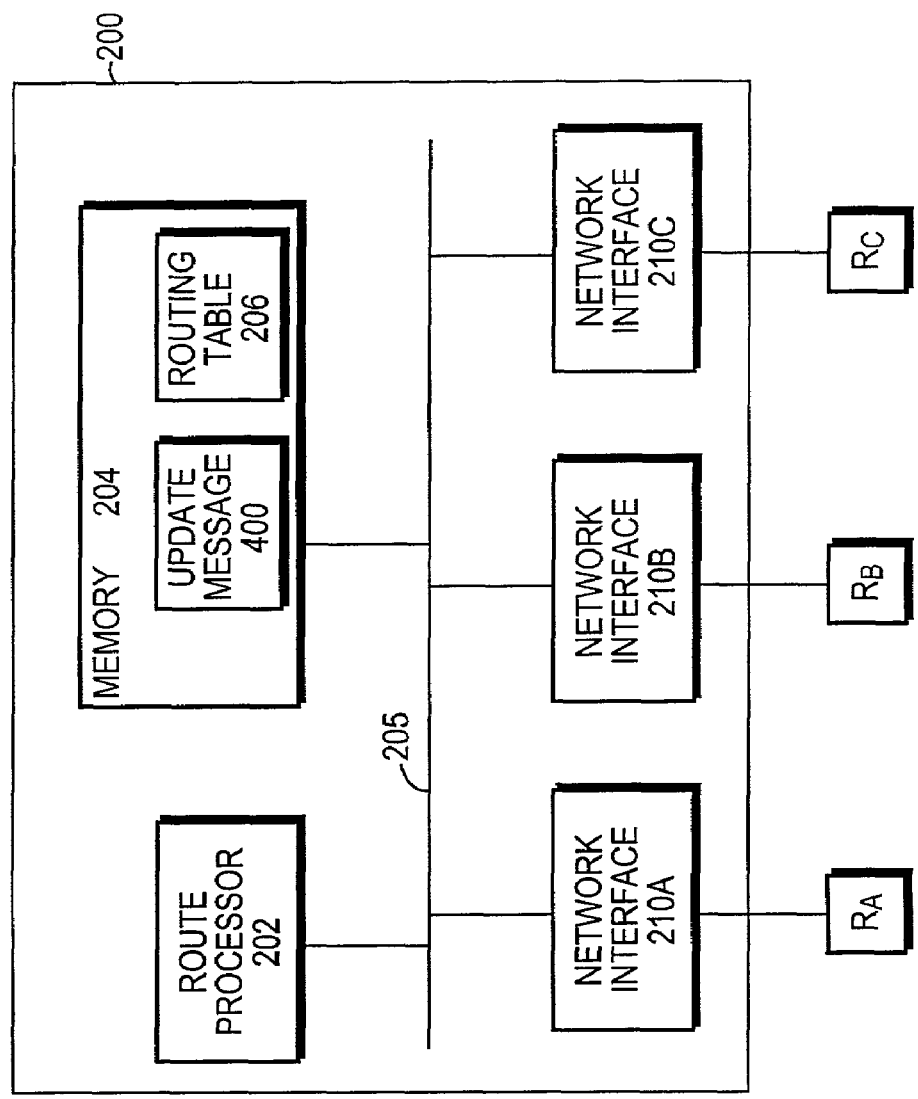
FIG. 2 is a schematic block diagram of an interdomain router comprising a route processor coupled to a memory and a plurality of network interfaces.

Each router typically comprises a plurality of interconnected elements, such as a processor, a memory and a network interface adapter. FIG. 2 is a schematic block diagram of an interdomain router 200 comprising a route processor 202 coupled to a memory 204 and a plurality of network interface adapters $210_{A-C}$ via a bus 205. The memory 204 may comprise storage locations addressable by the processor and interface adapters for storing software programs and data structures associated with the inventive routing update mechanism and technique. The route processor 202 may comprise processing elements or logic for executing the software programs and manipulating the data structures. An operating system, portions of which are typically resident in memory 204 and executed by the route processor, functionally organizes the router by, inter alia, invoking network operations in support of software processes executing on the router. It will be apparent to those skilled in the art that other processor and memory means, including various computer readable media, may be used for storing and executing program instructions pertaining to the inventive technique described herein.

Figure 3:
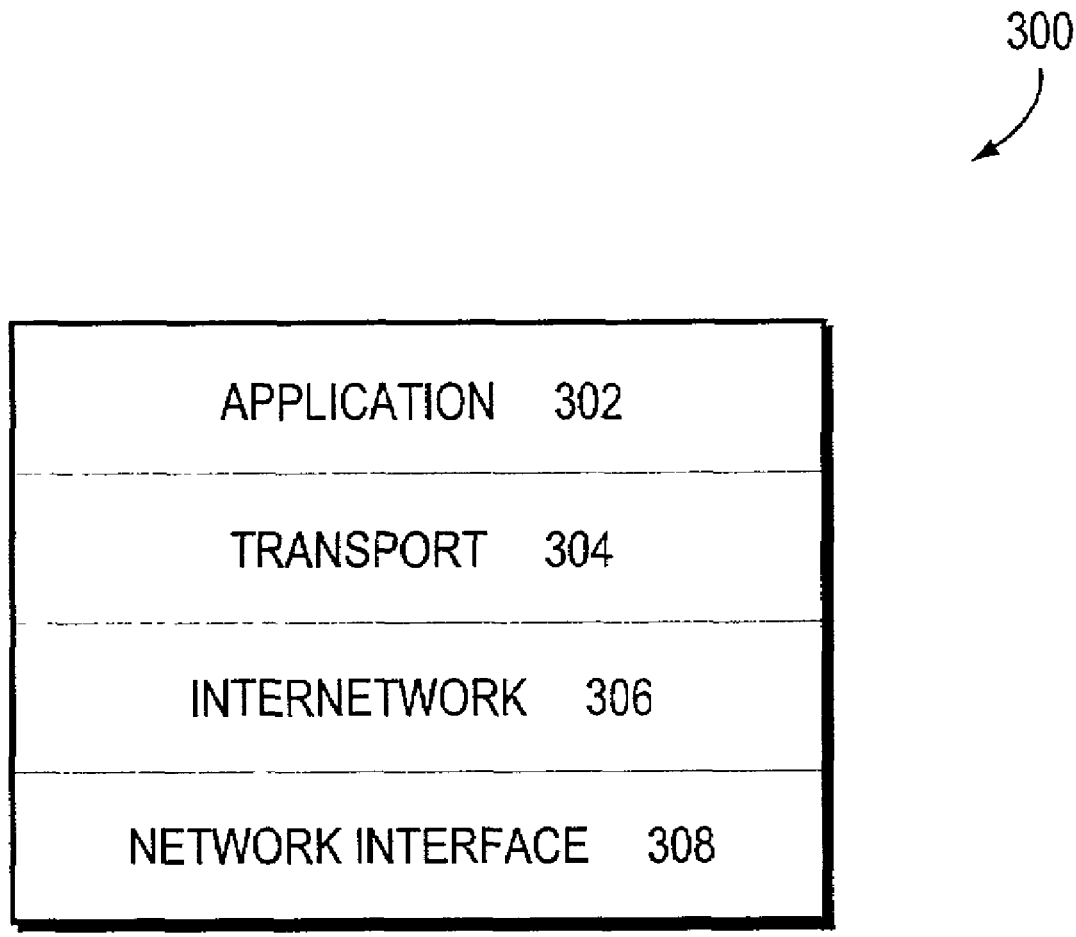
FIG. 3 is a schematic block diagram of a conventional protocol stack, such as the Internet communications protocol stack, within the interdomain router of FIG. 2.

A key function of the interdomain router is determining the next node to which a packet is sent; in order to accomplish such "routing", the interdomain routers 200 cooperate to determine optimal paths through the computer network 100. The routing function is preferably performed by an internetwork layer of a conventional protocol stack within each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet Protocol (IP). IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the Transmission Control Protocol (TCP) which is implemented by the transport layer and provides connection-oriented services to the upper layer protocols of the Internet architecture. The term TCP/IP is commonly used to denote the Internet architecture.

In particular, the internetwork layer 306 concerns the protocol and algorithms that interdomain routers 200 utilize so that they can cooperate to calculate paths through the computer network 100. An interdomain routing protocol, such as the Border Gateway Protocol (BGP), is used to perform interdomain routing (for the internetwork layer) through the computer network 100. The interdomain routers 200 (hereinafter "neighboring peer routers") exchange routing and reachability information among the autonomous systems over a reliable transport layer connection, such as TCP. The BGP protocol "runs" on top of the transport layer to ensure reliable communication among the neighboring routers.

In order to perform routing operations in accordance with the BGP protocol, each interdomain router 200 maintains a routing table 206 that lists all feasible paths to a particular network within an autonomous system. The routers further exchange routing information using routing update messages 400 when their routing tables change. The routing update messages are generated by an updating router to advertise optimal paths to each of its neighboring peer routers throughout the computer network. These routing updates allows the BGP routers of the autonomous systems to construct a consistent and up-to-date view of the network topology.

Figure 4:
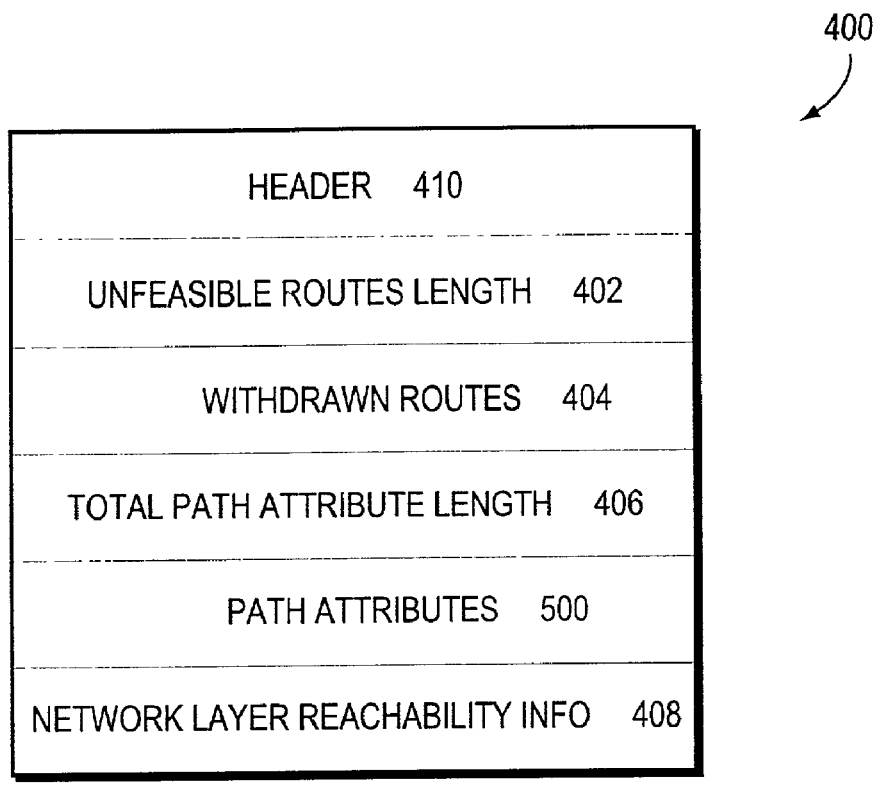
FIG. 4 is a schematic block diagram of a conventional update message, such as a Border Gateway Protocol (BGP) update message which may be advantageously used with the present invention.

FIG. 4 is a schematic block diagram of a conventional BGP update message 400 comprising a plurality of fields appended to a header 410. An unfeasible routes length field 402 indicates the total length of a withdrawn routes field 404, which contains a list of IP address prefixes for the routes being withdrawn from service. A total path attribute length field 406 indicates the total length of a path attributes field 500 and a network layer reachability information field 408 contains a list of IP address prefixes. The format and function of the update message 400 is described in RFC 1771 and *Interconnections, Bridges and Routers*.

Figure 5:
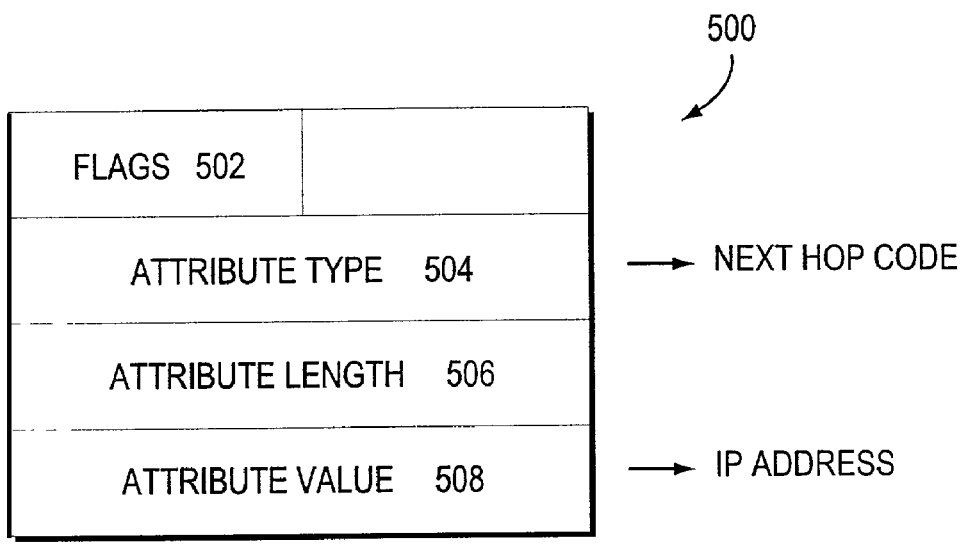
FIG. 5 is a schematic block diagram of a path attributes field of the BGP update message including an attribute type subfield which specifies a next-hop type code that may be advantageously used with the present invention.

Specifically, the path attributes field 500 comprises a sequence of fields, each describing a path attribute in the form of a triple (i.e., attribute type, attribute length, attribute value). FIG. 5 is a schematic block diagram of the path attributes field 500 comprising a plurality of subfields including a flags subfield 502, an attribute type subfield 504, an attribute length subfield 506 and an attribute value subfield 508. Of particular note to the present invention is the attribute type subfield 504 which specifies a plurality of attribute type codes, one of which is a next-hop code. The next-hop code defines an IP address of a (border) interdomain router (stored in the attribute value subfield 508) that is to be used as the "next-hop" to the destination IP addresses listed in the network layer reachability field 408 of update message 400.

The routing update messages 400 transmitted to the neighboring peer routers are typically generated by the updating router "walking-through" the routing table 206 and applying appropriate routing policies. When more than one neighbor share identical routing policies, "identical" routing messages may be sent to the neighbors if each neighbor shares a common subnet or network interface 210. As noted, generation of the routing update messages may then be optimized using a conventional group-based routing arrangement and replication process.

However if each neighbor does not share a common interface and, rather, is coupled to the updating router via, e.g., a separate point-to-point link, then a plurality of independent network interfaces $210_{A-C}$ are used and the conventional grouping and replication process cannot be employed. Here, external neighbors $R_{A-C}$ are connected via multiple interfaces and the next-hop path attribute 500 of the update message 400 is different for each neighbor. As a result, each routing update message is typically generated separately for each neighbor, resulting in substantially higher memory and processor utilization and slower routing updates.

In accordance with the invention, an improved group-based routing update technique is provided that allows limited per neighbor customization of routing update messages generated by an interdomain router for its neighboring peer routers within autonomous systems of the computer network. The inventive technique may be employed when the neighboring peer routers share identical routing policies, but the routing update messages differ only in certain attributes with known locations and lengths. Broadly stated, appropriate values of the location and length attributes for each neighboring router are calculated and stored during a novel replication stage of the inventive technique. Before each message is transmitted, the proper location and length attributes of the message are updated with the stored values for the respective neighbor.

Figure 6:
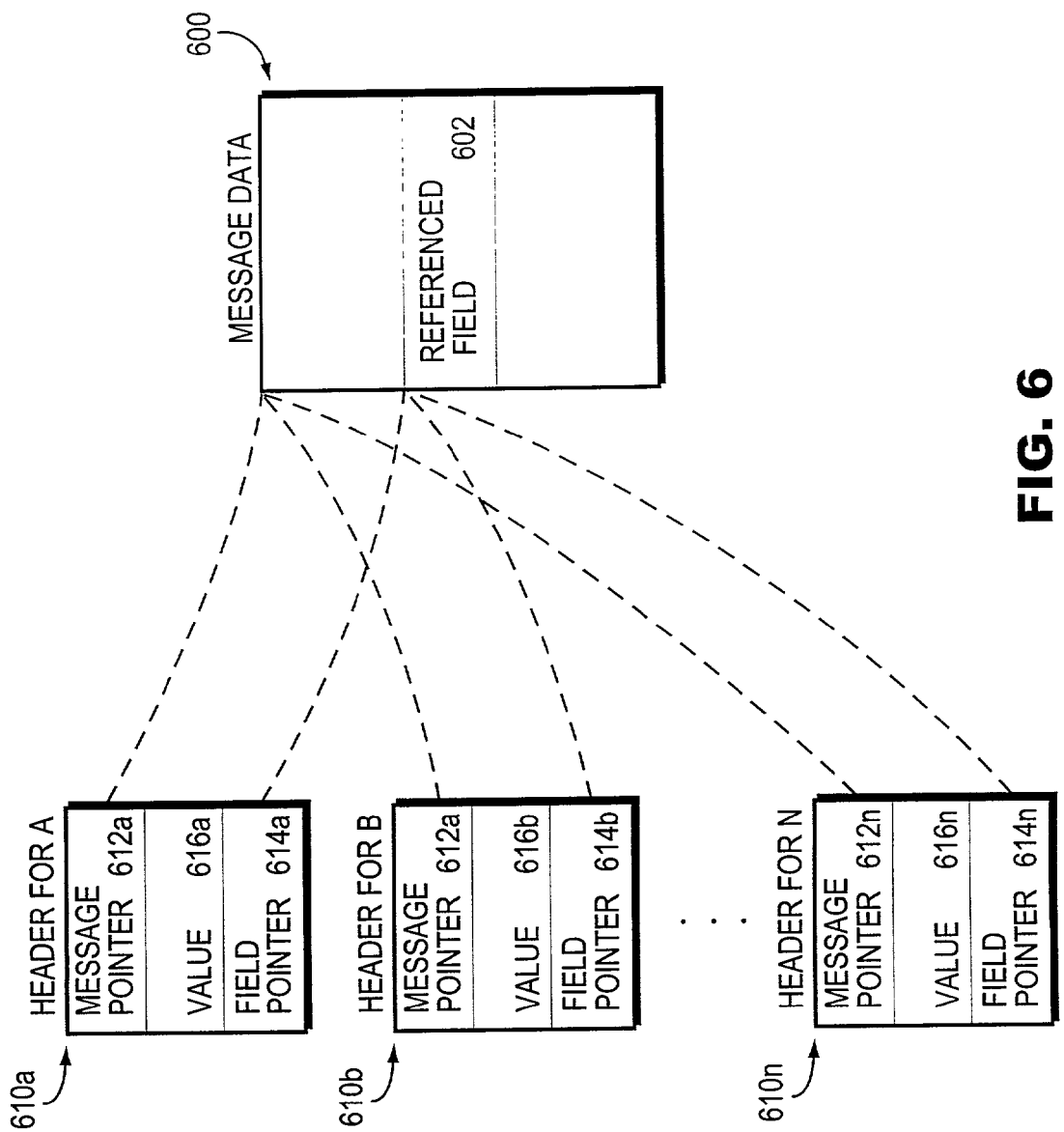
FIG. 6 is a functional block diagram illustrating an improved group-based routing update technique performed by an interdomain router when generating and transmitting routing update messages to neighboring peer routers within autonomous systems of a computer network in accordance with the present invention.

FIG. 6 is a functional block diagram illustrating the improved routing update technique performed by the route processor 202 of an interdomain router 200. According to the inventive technique, the interdomain router generates a routing update message comprising a message data portion 600 and further generates a plurality of headers 610*a-n*, each associated with a neighboring peer router. Each header is a data structure containing a plurality of pointers, one of which contains an address that references the beginning of the message data portion structure 600 stored in a memory, such as memory 204, of the interdomain router; this pointer is called the message pointer 612*a-n*. An example of the message data portion 600 may include the various fields of the BGP update message 400 (FIG. 4).

Another pointer of the header 610 contains an address that references a location (i.e., the referenced field 602) within the message data portion 600 that requires customization for each neighbor; this pointer is called the field pointer 614*a-n*. An example of the referenced field 602 may include the attribute value subfield 508 of the path attributes field 500 (FIG. 5). The header 610*a-n* further contains an actual value 616*a-n* to be loaded into the referenced field 602 for each neighbor router. An example of the value 616 loaded into field 602 may include an IP address of a next-hop interdomain router.

Operationally, the route processor 202 of the interdomain router 200 initially generates a routing update message comprising the message data portion 600 for a first is neighbor A. The processor 202 also generates a first header 610*a* for neighbor A that contains the message pointer 612*a* and the field pointer 614*a*, along with a first value 616*a* to be loaded into referenced field 602 of the message data portion 600 for the neighbor A. The update message is then replicated for a second neighbor B in accordance with the replication stage of the inventive technique by creating a second header 610*b* containing the message pointer 612*b* and the field pointer 614*b*. This time, however, the header 610*b* contains a second value 616*b* to be loaded into the referenced field 602 for neighbor B. The replication process is repeated for each neighboring peer router N receiving the routing update message. Immediately before transmitting the routing message 400 to each neighbor, the content of the referenced field 602 in the message data portion 600 is replaced by the value 616 contained in the header 610 for each neighboring peer router. Thereafter, the message 400 is transmitted to each neighbor.

The improved routing technique described herein provides substantial memory and processor savings for intermediate stations performing routing updates in large networks. Instead of generating different copies of the routing update message for each neighboring peer router, a single data portion of the update message is created and only a specific field of that message is customized for each neighbor prior to transmitting the message to that neighbor. In the case of memory savings, there is only one copy of the actual message data stored in memory. The size of the header is typically much smaller than that of the actual message data, thereby saving memory resources when replicating messages. In the case of the processor, the actual message data does not need to be generated for each neighbor; rather, the route processor merely computes the values for the specific fields of the update messages for the neighbors. Thus, the inventive technique substantially conserves memory and processor resources when generating and transmitting routing update messages in a large network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A router, comprising:
a memory having a computer program stored therein, said computer program to customize routing update messages generated by said router for a plurality of routers of a computer network;
a processor to execute said computer program;
first instructions of said computer program to create an update message having a first portion, said first portion having identical data to be sent to each router of said plurality of routers, and said update message having a second portion to be customized for each router of said plurality of routers;
second instructions of said computer program to generate a customized message for a selected router, said customized message having both said first portion of identical data and having said second portion customized for said selected router;
a network interface to transmit said customized message to said selected router; and,
third instructions of said computer program to repeat said second instructions to generate a further customized message, and said network interface transmitting said further customized message to each router of said plurality of routers.

2. The apparatus as in claim 1, wherein said memory further comprises:
a computer readable media having said computer program written thereon.

3. The apparatus as in claim 1, wherein said memory further comprises: storage locations addressable by said processor.

4. The apparatus as in claim 1, further comprising:
said memory storing said first portion of said update message.

5. The apparatus as in claim 1, further comprising:
fourth instructions of said computer program to generate said second portion of said update message for said each router, and to generate said customized message for said each router by combining said first portion and said second portion of said update message.

6. The apparatus as in claim 1, further comprising:
said processor generating a first header for each said router of said plurality of routers, said first header having a message pointer referencing said first portion of said update message stored in said memory, and a field pointer referencing said second portion of said update message for said each router.

7. A router, comprising:
a memory having a computer program stored in said memory, said computer program to customize routing update messages generated by said router for a plurality of routers of a computer network;
logic to execute said computer program;
first instructions of said computer program to create an update message having a first portion, said first portion having identical data to be sent to each router of said plurality of routers, and said update message having a second portion to be customized for each router of said plurality of routers;
second instructions of said computer program to generate a customized message for a selected router, said customized message having both said first portion of identical data and having said second portion customized for said selected router;
a network interface to transmit said customized message to said selected router; and,
third instructions of said computer program to repeat said second instructions to generate a further customized message, and said network interface transmitting said further customized message to each router of said plurality of routers.

8. The apparatus as in claim 7, wherein said memory further comprises:
a computer readable media having said computer program written thereon.

9. The apparatus as in claim 7, wherein said memory further comprises:
storage locations addressable by said logic.

10. The apparatus as in claim 7, further comprising:
said memory storing said first portion of said update message.

11. The apparatus as in claim 7, further comprising:
fourth instructions of said computer program to generate said second portion of said update message for said each router, and to generate said customized message for said each router by combining said first portion and said second portion of said update message.

12. The apparatus as in claim 7, further include:
said logic generating a first header for each said router of said plurality of routers, said first header having a message pointer referencing said first portion of said update message stored in said memory, and a field pointer referencing said second portion of said update message for said each router.

13. A method for operating a router, comprising:
storing a computer program in a memory, said computer program to customize routing update messages generated by said router for a plurality of routers of a computer network;
creating an update message by said computer program, said update message having a first portion, said first portion having identical data to be sent to each router of said plurality of routers, and said update message having a second portion to be customized for each router of said plurality of routers;
generating by said computer program a customized message for a selected router, said customized message having both said first portion of identical data and having said second portion customized for said selected router;
transmitting said customized message to said selected router; and,
repeating said generating step to generate a further customized message, and said network interface transmitting said further customized message to each router of said plurality of routers.

14. The method of claim 13 further comprising:
storing said update message in a memory of said router.

15. The method of claim 13 further comprising:
generating a first header for a first router of said plurality of routers, said first header comprising a message pointer referencing said identical data portion stored in said memory and a field pointer referencing said portion requiring customization for said first router.

16. The method of claim 15 wherein the step of generating the first header further comprises:
storing a calculated attribute value for said first router in said first header.

17. The method of claim 15 further comprising:
the step of generating a second header for a second router, said second header comprising said message pointer referencing said identical data portion stored in said memory and said field pointer referencing said data portion requiring customization for said second router.

18. The method of claim 17 wherein the step of generating said second header further comprises:
storing a calculated attribute value for said second router in said second header.

19. The method of claim 15 further comprising:
generating a header for each remaining router, said header comprising a message pointer referencing said identical data portion stored in said memory and a field pointer referencing said data portion requiring customization for each remaining router.

20. The method of claim 19 wherein the step of generating the header further comprises:
storing a calculated attribute value for each remaining router in each remaining header.

21. A program on a computer readable medium including instructions for executing on a processor, the instructions for operating a router, the instructions comprising instructions adapted to:
create an update message having a first portion, the first portion having identical data to be sent to each router of a plurality of routers, and the update message having a second portion to be customized for each router of the plurality of routers;
generate a customized message for a selected router, the customized message having both the first portion of identical data and the second portion customized for the selected router;
transmit the customized message to the selected router; and,
repeat the generation of further customized messages.

22. An apparatus, comprising:
a means for creating an update message having a first portion for identical data for each router of the plurality of routers and a second portion for customized data for each router of the plurality of routers;
a means for generating a customized message for a selected router, the customized message having both the first portion of identical data and the second portion customized for the selected router;
a means for transmitting the customized message to the selected router; and,
a means for repeating the generation of further customized messages.

23. The apparatus as in claim 22, further comprising:
a means for transmitting the further customized messages to each router.

24. The apparatus as in claim 22, further comprising:
a means for storing the first portion of the update message.

25. The apparatus as in claim 24, wherein the means for storing the first portion is a memory.

26. The apparatus as in claim 22, further comprising:
a means for generating a first header for a first router of the plurality of routers, the first header comprising a message pointer referencing the first portion and a field pointer referencing the second portion to be customized for the first router.

27. The apparatus of claim 26, further comprising:
a means for storing a calculated attribute value for the first router in the first header.

28. The apparatus as in claim 26, further comprising:
a means for generating a second header for a second router, the second header comprising the message pointer referencing the identical data portion stored in the memory and the field pointer referencing the data portion for the second router.

29. The apparatus as in claim 28, further comprising:
a means for storing a calculated attribute value for the second router in the second header.

* * * * *

UNITED STATES PATENT AND TRADEMARK OFFICE
CERTIFICATE OF CORRECTION

PATENT NO. : 7,457,251 B1 Page 1 of 1
APPLICATION NO. : 10/126206
DATED : November 25, 2008
INVENTOR(S) : Enke Chen It is certified that error appears in the above-identified patent and that said Letters Patent is hereby corrected as shown below:

Col. 6, Line 63, please amend as shown:

prising the message data portion 600 for a first[[ is]] neighbor A.

Signed and Sealed this

Twenty-sixth Day of October, 2010

David J. Kappos
*Director of the United States Patent and Trademark Office*